United States Patent
Sivinski et al.

(10) Patent No.: US 9,174,804 B2
(45) Date of Patent: Nov. 3, 2015

(54) CONVEYOR HOOD ASSEMBLY

(71) Applicants: Jeffrey Alan Sivinski, Cherokee, IA (US); David L. Christensen, Storm Lake, IA (US)

(72) Inventors: Jeffrey Alan Sivinski, Cherokee, IA (US); David L. Christensen, Storm Lake, IA (US)

(73) Assignee: HARVEST INTERNATIONAL, INC., Storm Lake, IA (US)

( * ) Notice: Subject to any disclaimer, the term of this patent is extended or adjusted under 35 U.S.C. 154(b) by 143 days.

(21) Appl. No.: 13/935,635

(22) Filed: Jul. 5, 2013

(65) Prior Publication Data

US 2014/0008180 A1 Jan. 9, 2014

Related U.S. Application Data

(60) Provisional application No. 61/668,187, filed on Jul. 5, 2012.

(51) Int. Cl.
| | |
|---|---|
| *B65G 21/08* | (2006.01) |
| *B65G 21/10* | (2006.01) |
| *B65G 37/00* | (2006.01) |
| *B65G 11/18* | (2006.01) |
| *B65G 41/00* | (2006.01) |

(52) U.S. Cl.
CPC .............. *B65G 21/10* (2013.01); *B65G 11/186* (2013.01); *B65G 21/08* (2013.01); *B65G 37/00* (2013.01); *B65G 41/002* (2013.01)

(58) Field of Classification Search
CPC ...... B65G 21/10; B65G 41/002; B65G 21/08; B65G 65/23
See application file for complete search history.

(56) References Cited

U.S. PATENT DOCUMENTS

| 4,261,520 | A * | 4/1981 | Hetrick ..................... 239/657 |
| 4,981,204 | A * | 1/1991 | Smith ....................... 198/313 |
| 5,961,002 | A * | 10/1999 | Taylor et al. ............... 222/164 |
| 6,681,921 | B1 * | 1/2004 | Schroeder ................. 198/818 |
| 8,083,047 | B1 * | 12/2011 | Hermann et al. .......... 198/313 |
| 8,876,456 | B2 * | 11/2014 | Kowalchuk et al. ........ 414/523 |
| 8,967,940 | B2 * | 3/2015 | Petersen et al. ............ 414/523 |

(Continued)

FOREIGN PATENT DOCUMENTS

| JP | 2001-314115 A | 11/2001 |
| JP | 3368485 B2 | 11/2002 |
| WO | WO 2006/007626 A1 | 1/2006 |

OTHER PUBLICATIONS

DMC David Manufacturing Co., "Enclosed Roller Belt Conveyors" Specification Brochure.

(Continued)

*Primary Examiner* — Gene Crawford
*Assistant Examiner* — Thomas Randazzo
(74) *Attorney, Agent, or Firm* — McKee, Voorhees & Sease, PLC (57) ABSTRACT

A hood assembly is provided for a conveyor having a housing with an inlet opening, a belt or auger for transporting particulate material through the housing from the inlet end to the outlet end. The hood assembly includes a hood pivotally mounted to the housing for movement between a closed position substantially closing the inlet end and an open position substantially exposing the inlet end. When the hood is opened, the inlet end of the conveyor housing can be visually inspected and physically cleaned to remove particulate material remnants remaining in the inlet end after the conveyor is shut off. A hopper is provided on the hood to facilitate introduction of material into the conveyor.

21 Claims, 13 Drawing Sheets

(56) References Cited

U.S. PATENT DOCUMENTS

| | | | |
|---|---|---|---|
| 2006/0163283 A1* | 7/2006 | Grady | 222/168 |
| 2007/0062381 A1* | 3/2007 | Quantz et al. | 99/568 |
| 2010/0314221 A1* | 12/2010 | Garberson et al. | 198/617 |
| 2011/0127138 A1* | 6/2011 | Sanders | 198/300 |
| 2011/0170962 A1* | 7/2011 | Watson et al. | 406/108 |
| 2012/0145517 A1* | 6/2012 | Zazula et al. | 198/582 |
| 2012/0318640 A1* | 12/2012 | Zazula | 198/540 |
| 2013/0239536 A1* | 9/2013 | Houssian | 56/16.6 |

OTHER PUBLICATIONS

JP 3368485 (Not available) Pub JP8089072A—Ishii Seisakusho—English Translation.

JP 2001-314115—Iseki Agricultural Machinery—English Translation.

* cited by examiner

CONVEYOR HOOD ASSEMBLY

CROSS-REFERENCE TO RELATED APPLICATIONS

This application claims priority under 35 U.S.C. §120 to provisional application Ser. No. 61/668,187 filed Jul. 5, 2012, herein incorporated by reference in its entirety.

FIELD OF THE INVENTION

The present invention is directed towards an agricultural conveyor for transporting seed, grain, and similar particulate materials, and particularly biologically engineered or modified materials wherein there is a need or desire to prevent contamination from one batch of materials moved through the conveyor to another batch of materials moved through the conveyor.

BACKGROUND OF THE INVENTION

Agricultural conveyors are used for conveying various grains and seeds. With advances in bioengineered seeds, there is a need to avoid cross contamination from different seeds and hybrids. Conventional conveyors, including a tube conveyor with an internal belt, typically have spillage problems, both at the inlet and at the discharge end. During operation of the conveyor, spilled seeds tend to migrate downwardly to the conveyor inlet end. Conventional conveyors have a small door on the end of the inlet housing to facilitate clean-out of remnant seeds. However, the small size of the door limits access to the components at the inlet end, including the brush, skirts, roller, and corners of the housing. Thus, an operator cannot conduct a full or complete visual inspection of the lower end of the conveyor to assure that all seeds have been cleaned out. If a batch of seeds becomes contaminated, the batch must be thrown out, at a cost of thousands and tens of thousands of dollars.

Therefore, a primary objective of the present invention is the provision of an improved belt conveyor assembly having a pivotal inlet hood for complete clean-out of the inlet housing.

Another objective of the present invention is the provision of a conveyor hood which allows complete visual inspection of the conveyor inlet housing.

Another objective of the present invention is the provision of a conveyor hood which opens fully to allow access to all of the components at the lower end of the conveyor for removal of seed remnants.

A further objective of the present invention is the provision of a hood on an agricultural conveyor which provides complete and easy removal of all seed, grain and other similar materials collected in the inlet end of the conveyor.

Still another objective of the present invention is the provision of an agricultural conveyor having an improved inlet hood which can be quickly and easily moved between a closed use position and an open clean out position.

Yet another objective of the present invention is the provision of a method for preventing biological contamination of seeds and grains in an agricultural conveyor.

A further objective of the present invention is the provision of a method for quickly and easily cleaning out particulates from the inlet end of a grain and seed conveyor.

Another objective of the present invention is the provision of an agricultural conveyor with an improved hood which is economical to manufacture, and safe and durable in use.

These and other objectives will become apparent from the following description of the invention.

SUMMARY OF THE INVENTION

The conveyor hood assembly of the present invention is intended for use on agricultural conveyors and other applications wherein there is a need for full access to the end of the conveyor, for example, to facilitate cleanout of the inlet end of the conveyor to prevent cross contamination between different batches of seed, grain or other material passing through the conveyor. The hood assembly is pivotally attached to the conveyor frame or body so as to be movable between a closed use position and an open cleanout position. An inlet hopper is provided on the hood for directing seed, grain and other materials into the conveyor. A small door is provided on the hood assembly for use in instances when opening of the hood assembly is unnecessary. When the hood assembly is opened, the inlet end of the conveyor is exposed at both the end and the top to provide physical access and visual inspection.

DETAILED DESCRIPTION OF THE PREFERRED EMBODIMENTS

A particulate material conveyor is generally designated by the reference numeral 10 in FIGS. 1-4. While the conveyor is shown to be a tube-style conveyor with an endless loop belt, it is understood that the conveyor may take other forms, such as a flat belt conveyor or an auger conveyor. The conveyor 10 includes an inlet end 12 and an outlet end 14. The inlet end includes a housing 16 with a hopper 22 for receiving seed or other particulate material for conveying to the outlet end 14, wherein the seed or material is discharged through a head 20.

The hopper 22 may have various shapes to facilitate introduction of seed or material into the conveyor 10.

The conveyor 10 has pulleys 24 at the opposite ends 12, 14, with a belt being trained about the pulleys 24. One of the pulleys 24 is driven by a drive mechanism (not shown), such as an electric motor, a gasoline engine, a tractor PTO, or a hydraulic motor, attached to the pulley axle 28 such that the belt will travel around the pulleys 24. The tension on the belt can be adjusted by moving the pulley 24 longitudinally within the housing 16 via a pair of slots 30 in the sidewalls of the housing 16.

The present invention is directed towards a hood assembly 32 on the housing 16. More particularly, the hood assembly 32 covers the end and top side of the housing 16. The hood 32 is pivotally connected to the housing 16 via mounting brackets 34 and a pivotal axle 36 for movement between a closed use position, shown in FIGS. 5-11, and an open clean out position shown in FIGS. 11-13. A biasing spring 38 may be provided on the axle 36 to provide a spring assist during opening and/or closing of the hood 32. The hopper 22 is mounted on the hood 32. The hood 32 may also include a small door 44 which can be opened and closed when full opening of the hood assembly 32 is not needed.

The hood 32 has an upper portion 46 residing substantially parallel to the housing 16 when the hood is closed and an end portion 48 extending transversely across the end of the housing 16 when the hood is closed. The upper portion 46 has an opening 50 through which material passes from the hopper 22 into the conveyor and onto the belt or auger.

Figure 1:
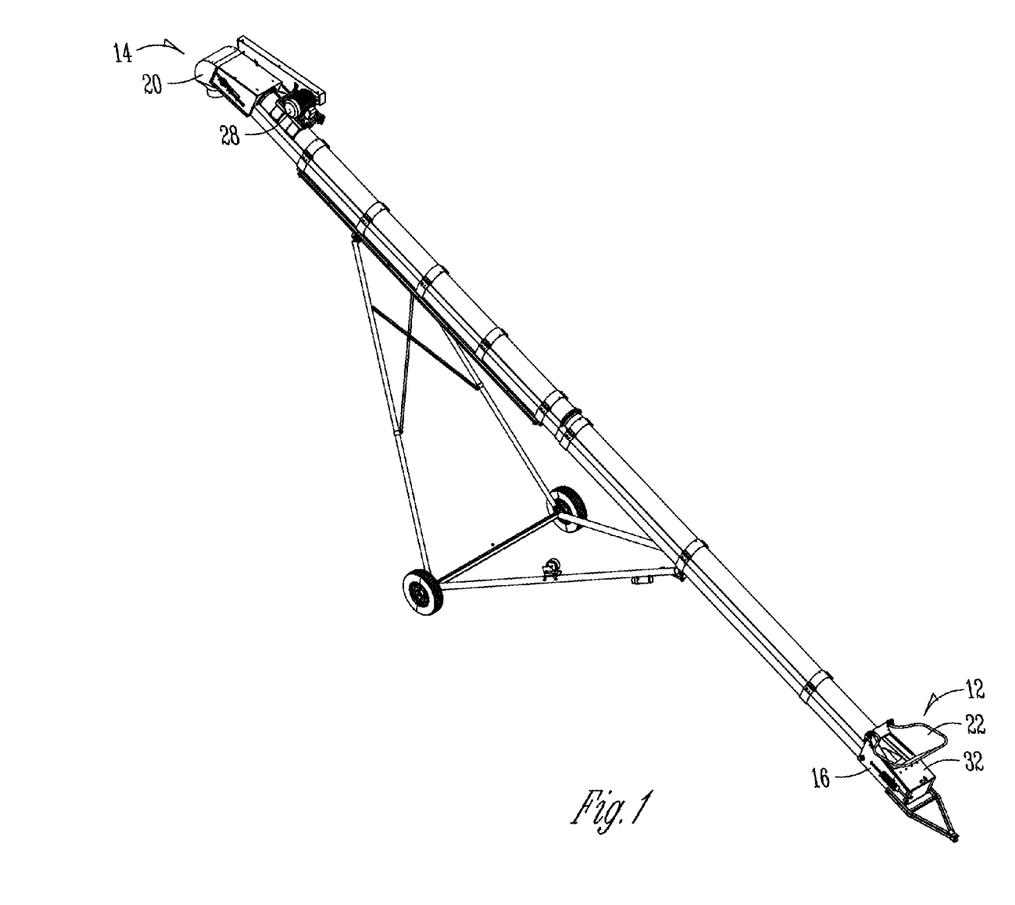
FIG. 1 is a perspective view of the conveyor of the present invention with the hood in a closed position.
Figure 2:
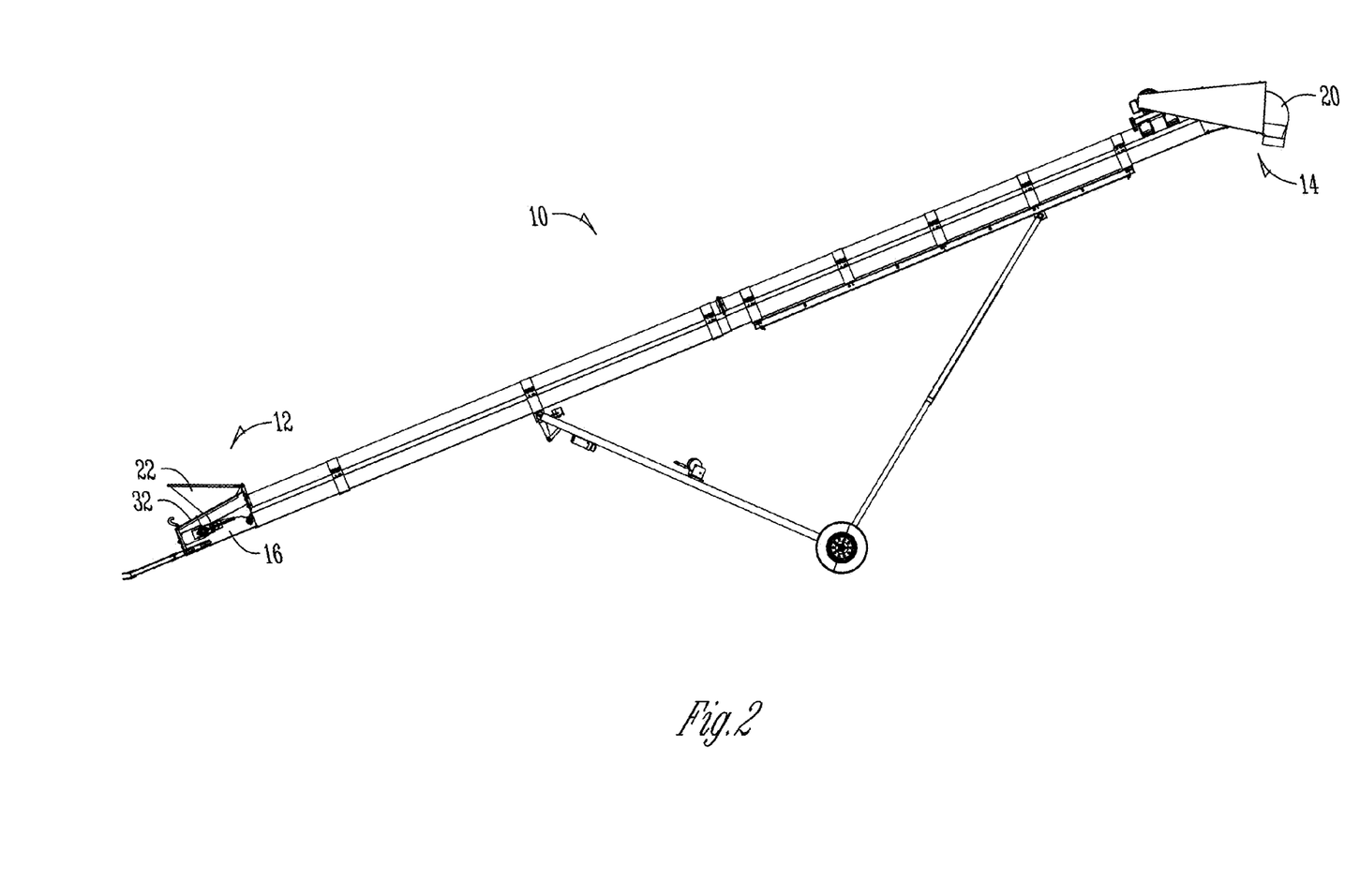
FIG. 2 is a side elevation view of the conveyor of the present invention with the hood in a closed position.
Figure 3:
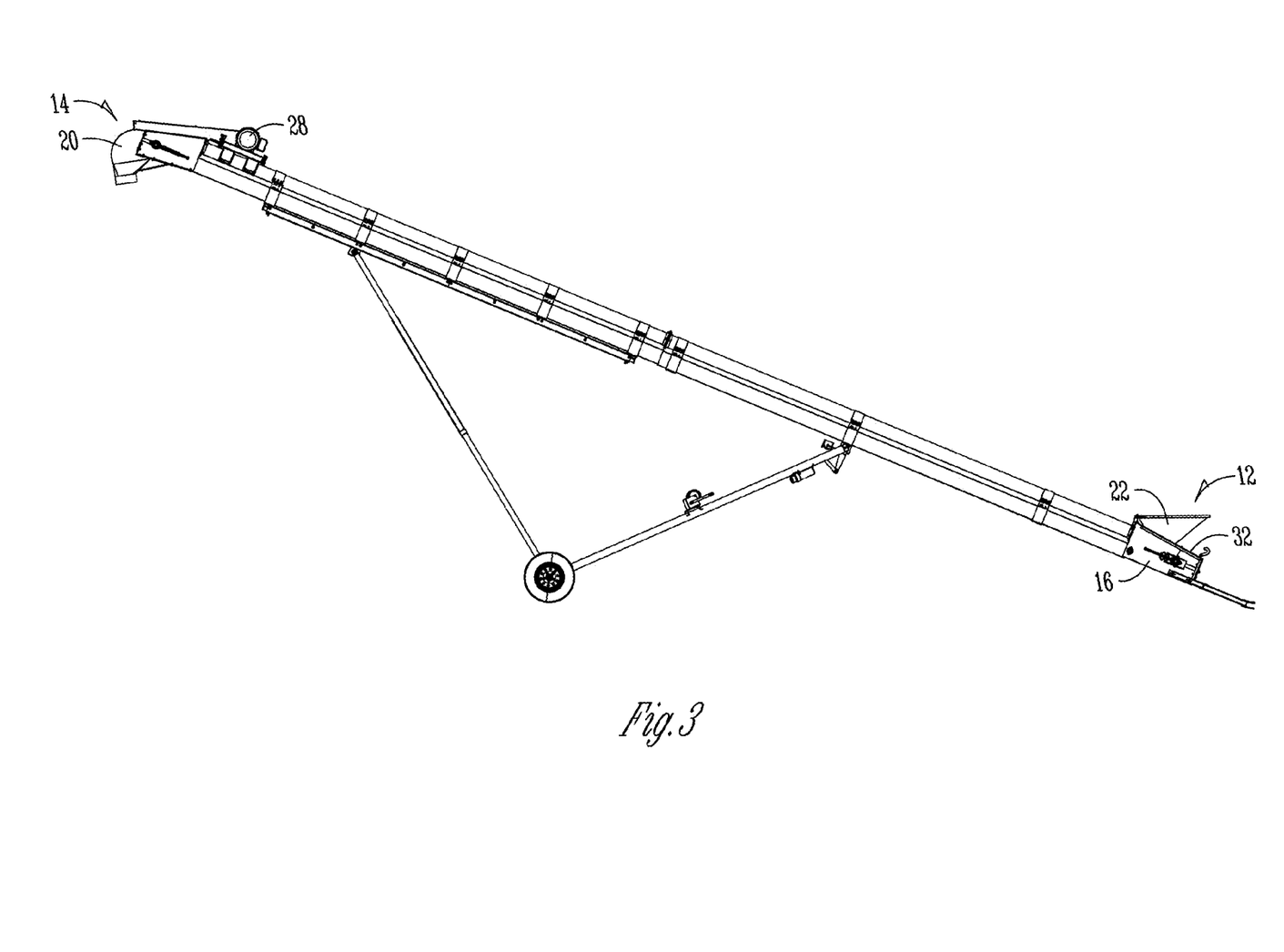
FIG. 3 is another side elevation view of the conveyor of the present invention, from the opposite side of FIG. 2, with the hood in a closed position.
Figure 4:
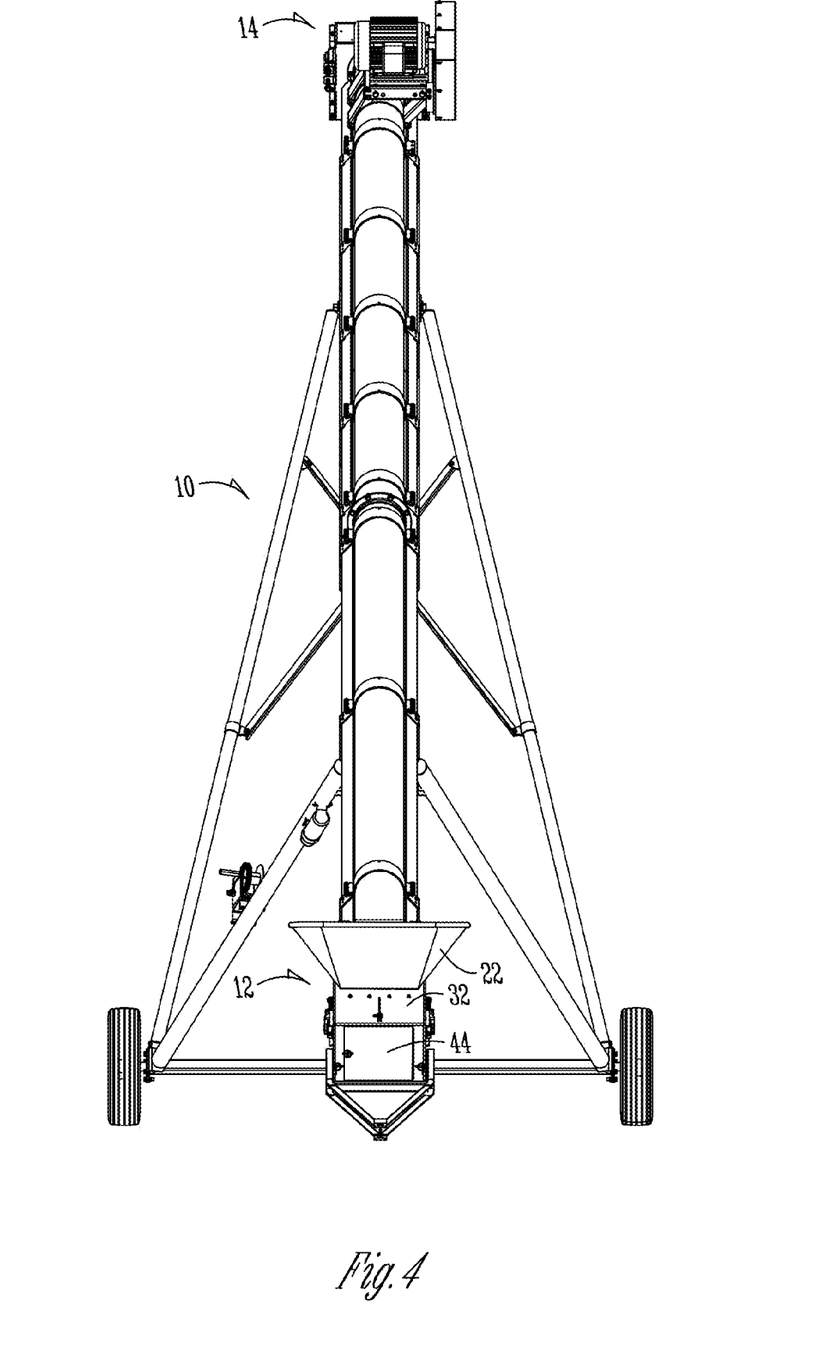
FIG. 4 is an end elevation view of the conveyor of the present invention with the hood in a closed position.
Figure 5:
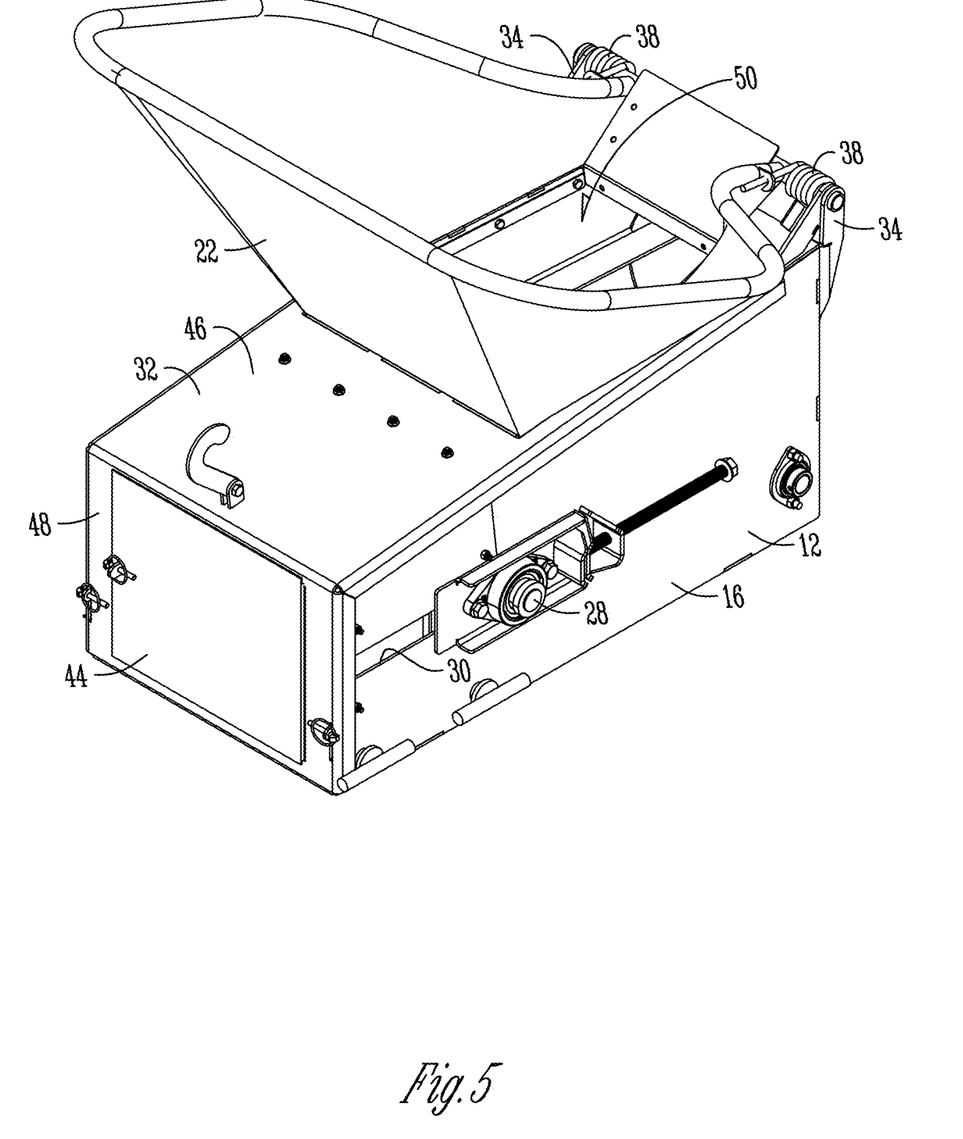
FIG. 5 is an enlarged perspective view of the inlet housing, hood and hopper assembly for the conveyor according to the present invention, with the hood being in a closed position.
Figure 6:
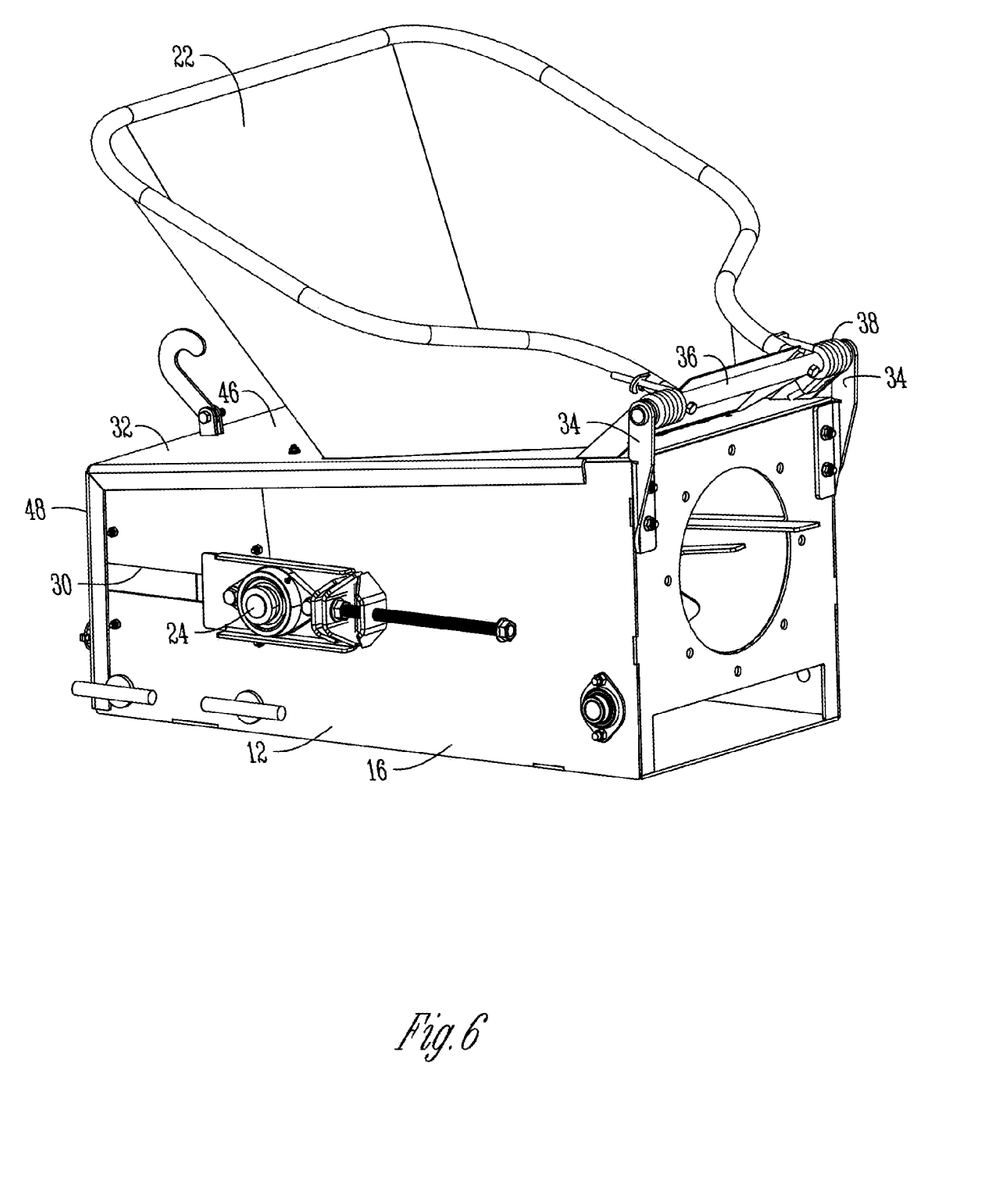
FIG. 6 is another perspective view of the inlet assembly of the present invention, with the hood being in a closed position.
Figure 7:
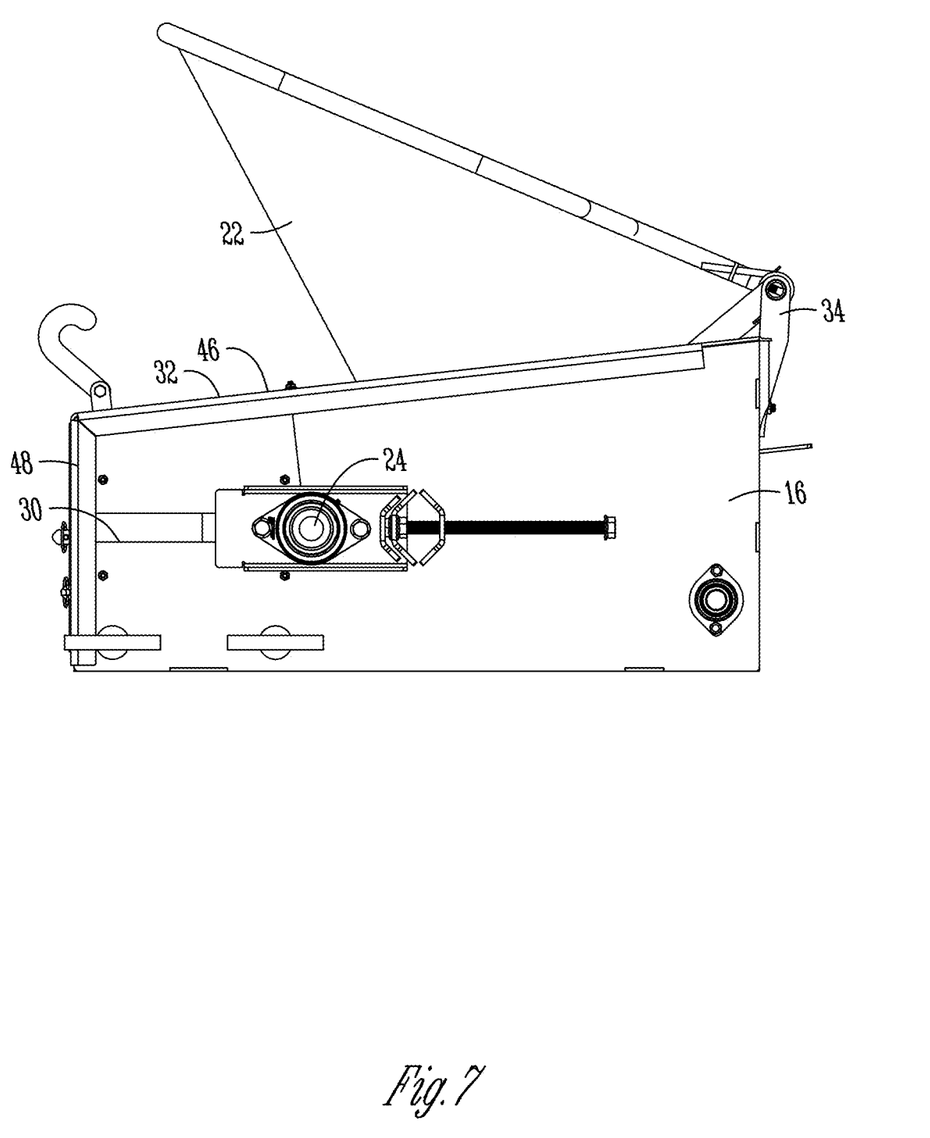
FIG. 7 is a side elevation view of the inlet housing, hood, and hopper, with the hood being in a closed position.
Figure 8:
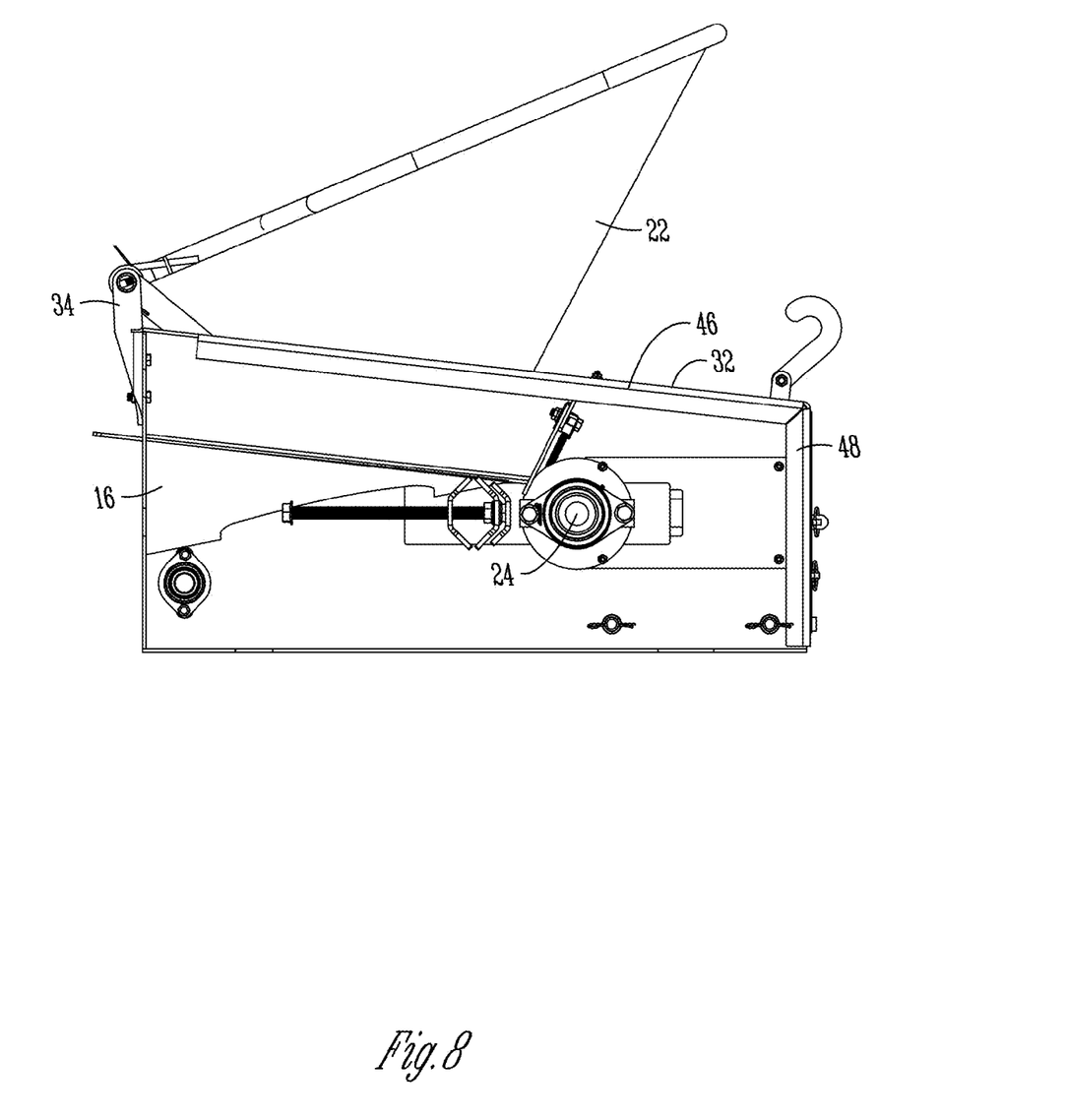
FIG. 8 is a side elevation view from the opposite side of FIG. 7, with the hood closed.
Figure 9:
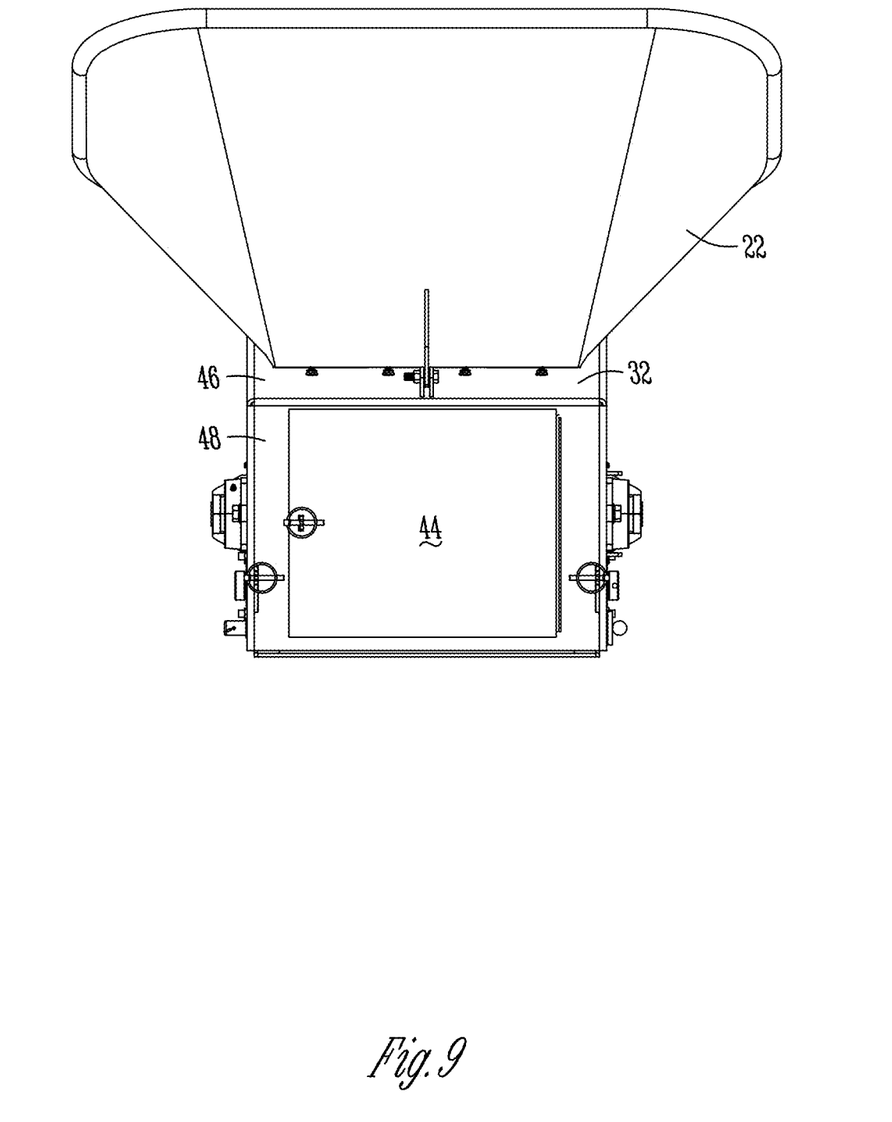
FIG. 9 is an end elevation view of the housing, hood, and hopper, with the hood being in a closed position.
Figure 10:
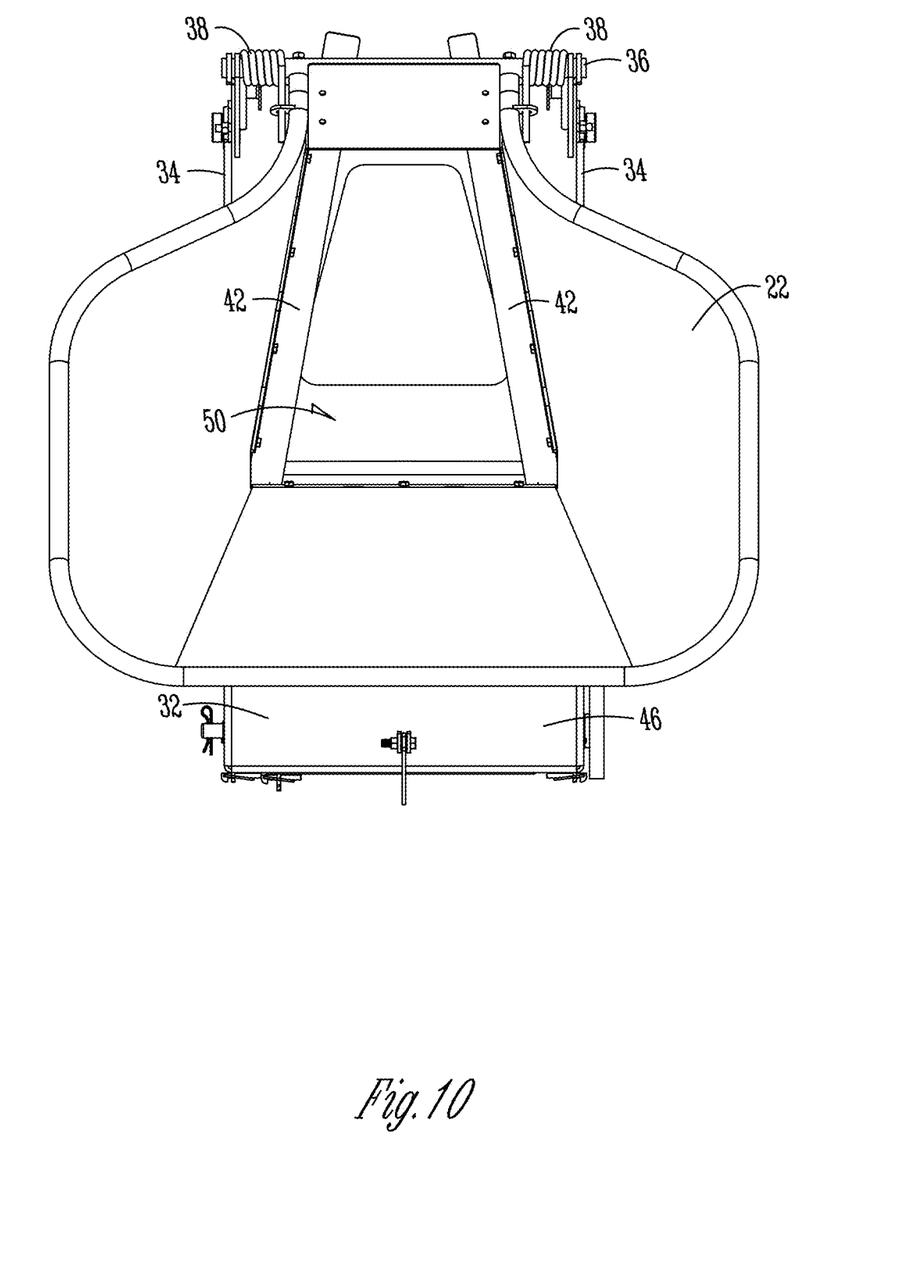
FIG. 10 is a top plan view of the housing, hood, and hopper with the hood being in a closed position.
Figure 11:
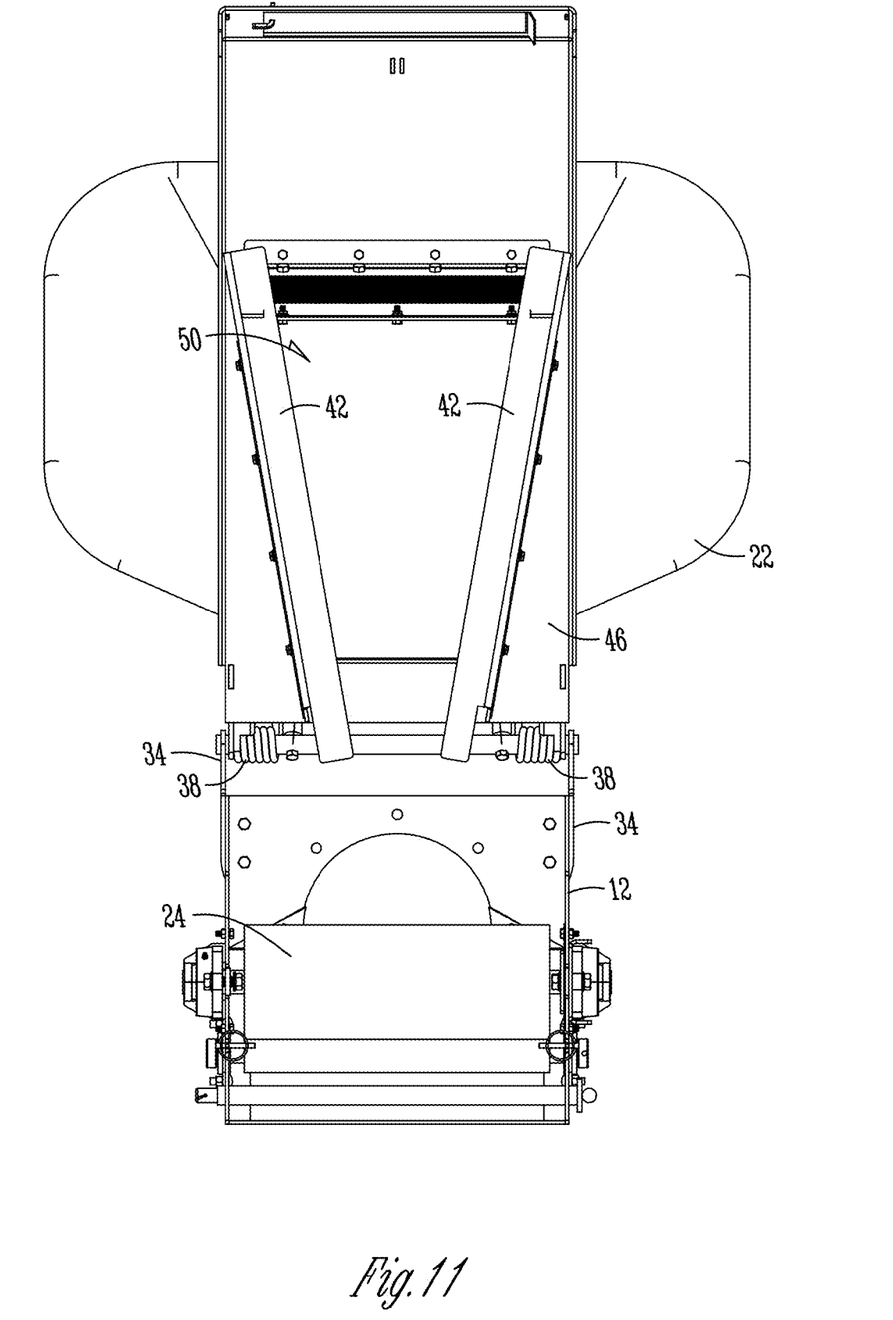
FIG. 11 is an end elevation view of the inlet assembly with the hood fully opened.
Figure 12:
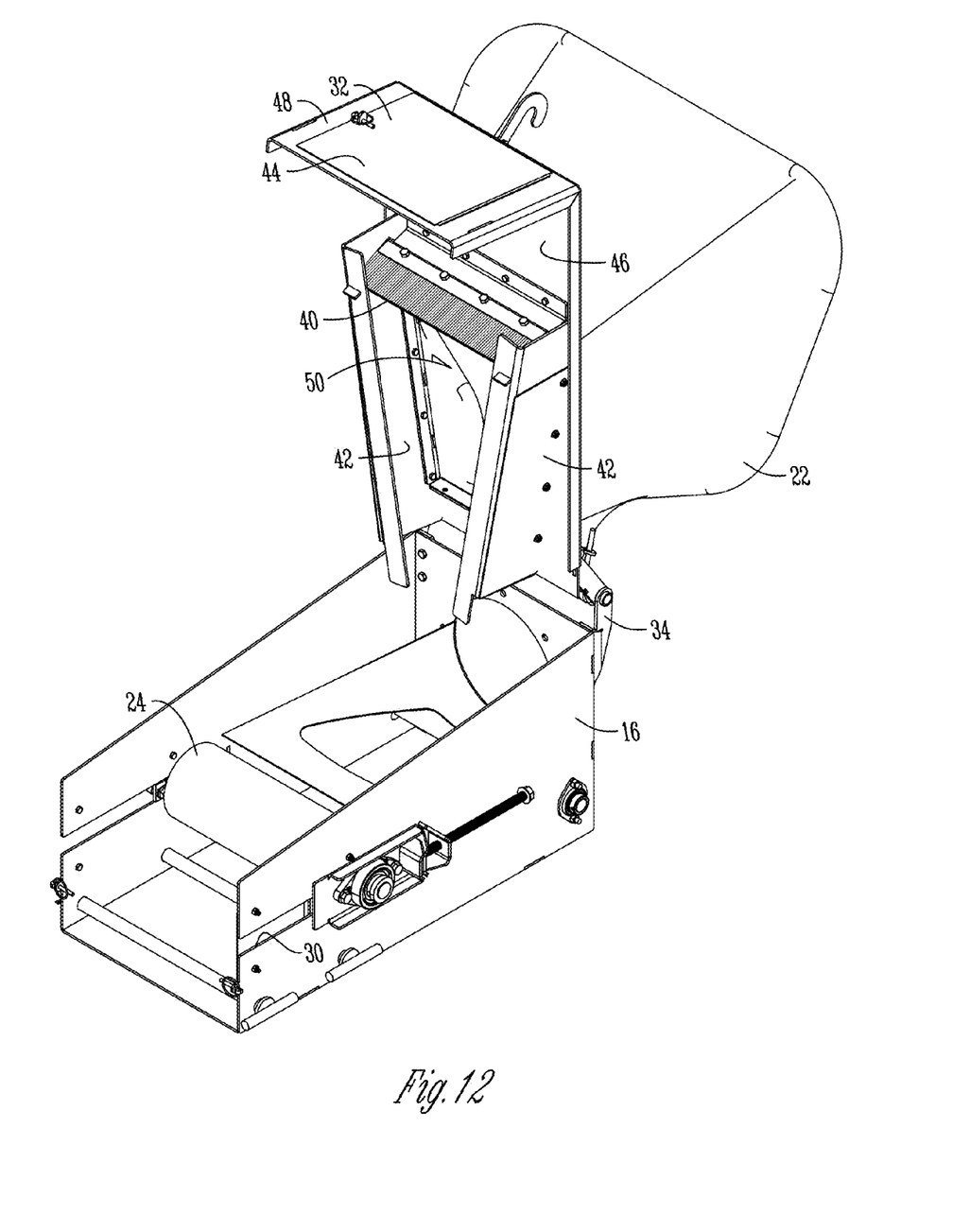
FIG. 12 is a perspective of the housing and hood, with the hood in an open position, with the belt removed for clarity.
Figure 13:
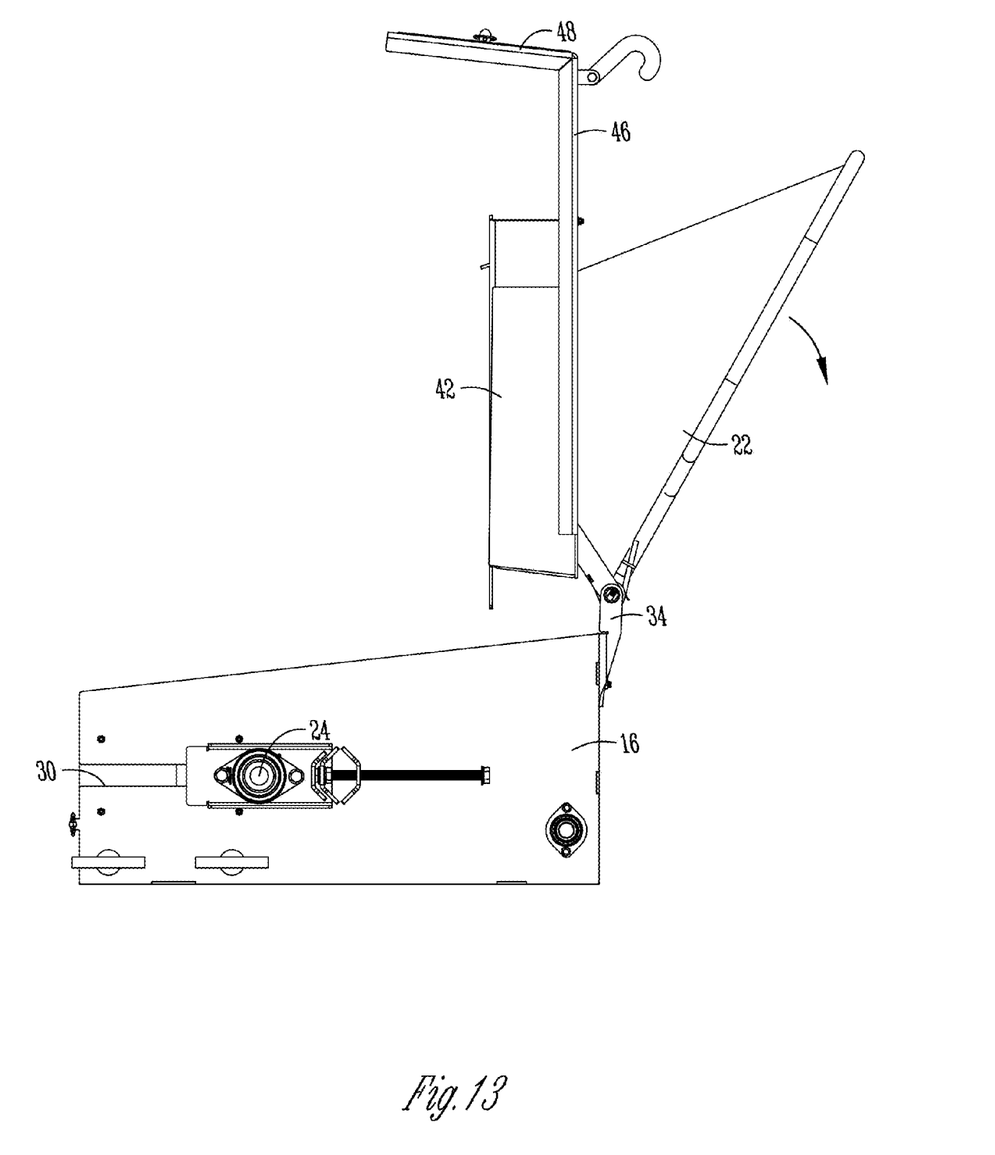
FIG. 13 is a side elevation view of the housing and hood, with the hood in an open position.

As seen in FIGS. 11 and 12, when the hood assembly 32 is opened, the interior of the housing 16 is easily accessible from both the top and the end for visual inspection and for clean-out of residual seeds or particulate material. The brush 40 and skirts 42 on the hood 32 are also easily and completely inspected for quick and easy removal of seeds and material. Removal of the seeds, grain and other materials can be accomplished by any convenient means, such as vacuum, air pressure, or manually.

The hood assembly 32 is closed before the conveyor 10 is actuated to transport seed, grain or other materials. After the drive mechanism (not shown) has been turned off so that the belt is not moving, the hood 32 can be opened so that the operator can inspect the housing 16, the brush 40, the skirts 42, and all other related components at the inlet end 12 of the conveyor 10 and remove any trapped seeds which are found. After the inlet end 12 is cleaned out, the hood assembly 32 can be closed. The spring biased hinge 38 makes opening and closing of the hood 32 quick and easy.

The hood 32 can be pivoted from the closed position to the opened position wherein the hopper 22 and hood 32 rest upon the conveyor tube. The hood pivots approximately 180° between the closed position and the open position.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. An improved enclosed belt conveyor assembly for particulate material, the conveyor having opposite inlet and outlet ends, opposite pulleys at the inlet and outlet ends, a drive device to drive one of the pulleys, a belt trained about the pulleys for conveying particulate material from the inlet end to the outlet end, and a housing enclosing the belt, the housing having an open top portion and an open end portion, the improvement comprising:

a hood pivotally mounted to the housing at the inlet end and moveable between a closed position covering the open top and end portions during operation of the conveyor and an open position uncovering the open top and end portions to provide access to the interior of the housing adjacent the inlet end when the conveyor is not operating; and the hood having an upper opening through which material passes by gravity onto the belt when the hood is in the closed position.

2. The conveyor assembly of claim 1 wherein the hood has a pivot axis at one end.

3. The conveyor assembly of claim 1 wherein the hood has a spring-assist for movement from the closed to open position.

4. The conveyor assembly of claim 1 further comprising a hopper mounted on the hood to introduce particulate material onto the conveyor belt.

5. The conveyor assembly of claim 1 wherein the hood has a pivotal door to provide access inside the inlet end when the hood is in the closed position.

6. The conveyor assembly of claim 1 wherein an upper portion of the hood is hinged to the housing.

7. A hood assembly for a conveyor having a housing with an inlet opening, comprising:

a hood pivotally connected to the housing for movement between a closed position substantially covering the inlet opening and an open position substantially exposing the inlet opening;

a hopper mounted on top of the hood to receive particulate material; and the hood having an upper opening beneath the hopper therein through which particulate material passes by gravity from the hopper to the conveyor.

8. The hood assembly of claim 7 wherein a hinged bracket mounts the hood to the housing.

9. The hood assembly of claim 7 wherein the hood has an upper portion extending parallel to the housing and an end portion extending transverse to the housing.

10. The hood assembly of claim 7 further comprising a spring between the hood and the housing to bias the hood towards the open position.

11. The hood assembly of claim 7 wherein the hood pivots substantially 180° between the open and closed positions.

12. The hood assembly of claim 11 further comprising the hopper resides above the hood when the hood is in the closed position.

13. A method of eliminating residual particulate material in an agricultural conveyor having opposite inlet and outlet ends, a housing at the inlet end with an open top portion and an open end portion, a hood mounted on the housing, and a belt extending around pulleys adjacent the inlet and outlet to carry the material from the inlet to the outlet, the method comprising:

dropping particulate material into the inlet of the conveyor via a hopper on top of the hood and an opening in the hood beneath the hopper moving the hood from a closed position substantially covering the open top and end portions of the housing to an open position uncovering the open top and end portions of the housing; then visually inspecting the inlet of the conveyor via the uncovered open top and end portions of the housing; and removing substantially all particulate material collected in the inlet and in the hood; and then moving the hood from the open position to the closed position.

14. The method of claim 13 further comprising biasing the hood with a spring to facilitate movement to the open position.

15. The method of claim 13 wherein the hood movement is pivotal between the open and closed positions.

16. The method of claim 13 wherein the particles are removed with pressurized air.

17. An improved enclosed belt conveyor assembly for particulate material, the conveyor assembly having opposite inlet and outlet ends, opposite pulleys at the inlet and outlet ends, a drive device to drive one of the pulleys, a belt trained about the pulleys for conveying particulate material from the inlet end to the outlet end, and a housing enclosing the belt, the housing having an open top portion and an open end portion, the improvement comprising:
   a hood pivotally mounted to the housing at the inlet end and movable between a closed position covering the open top and end portions during operation of the conveyor and an open position uncovering the open top and end portions to provide access to the interior of the housing adjacent the inlet end when the conveyor is not operating; and
   the hood having a spring-assist for movement from the closed to open position.

18. An improved enclosed belt conveyor assembly for particulate material, the conveyor assembly having opposite inlet and outlet ends, opposite pulleys at the inlet and outlet ends, a drive device to drive one of the pulleys, a belt trained about the pulleys for conveying particulate material from the inlet end to the outlet end, and a housing enclosing the belt, the housing having an open top portion and an open end portion, the improvement comprising:
   a hood pivotally mounted to the housing at the inlet end and moveable between a closed position covering the open top and end portions during operation of the conveyor and an open position uncovering the open top and end portions to provide access to the interior of the housing adjacent the inlet end when the conveyor is not operating; and
   the hood having a pivotal door to provide access inside the inlet end when the hood is in the closed position.

19. A method of eliminating residual particulate material in an agricultural conveyor having opposite inlet and outlet ends, a housing at the inlet end with an open top portion and an open end portion, a hood mounted on the housing, and a belt extending around pulleys adjacent the inlet and outlet to carry the material from the inlet to the outlet, the method comprising:
   moving the hood from a closed position substantially covering the open top and end portions of the housing to an open position uncovering the open top and end portions of the housing; then
   visually inspecting the inlet of the conveyor via uncovered open top and end portions of the housing
   removing substantially all particulate material collected in the inlet and in the hood; and then
   moving the hood from the open position to the closed position; and
   biasing the hood with a spring to facilitate movement to the open position.

20. An improved enclosed belt conveyor assembly for particulate material, the conveyor assembly having opposite inlet and outlet ends, opposite pulleys at the inlet and outlet ends, a drive device to drive one of the pulleys, a belt trained about the pulleys for conveying particulate material from the inlet end to the outlet end, and a housing enclosing the belt, the housing having an open top portion and an open end portion, the improvement comprising:
   a hood pivotally mounted to the housing at the inlet end and moveable between a closed position covering the open top and end portions during operation of the conveyor and an open position uncovering the open top and end portions to provide access to the interior of the housing adjacent the inlet end when the conveyor is not operating; and
   a hopper mounted on top of the hood to introduce particulate material onto the conveyor belt.

21. The conveyor assembly of claim 20 wherein the hopper moves with the hood during opening and closing.

* * * * *